United States Patent
Tangudu et al.

(10) Patent No.: US 10,767,691 B2
(45) Date of Patent: Sep. 8, 2020

(54) MAGNETIC BEARING

(71) Applicant: Carrier Corporation, Jupiter, FL (US)

(72) Inventors: Jagadeesh K. Tangudu, South Windsor, CT (US); Parag M. Kshirsagar, South Windsor, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 271 days.

(21) Appl. No.: 15/548,613

(22) PCT Filed: Feb. 15, 2016

(86) PCT No.: PCT/US2016/017943
§ 371 (c)(1),
(2) Date: Aug. 3, 2017

(87) PCT Pub. No.: WO2016/137775
PCT Pub. Date: Sep. 1, 2016

(65) Prior Publication Data
US 2018/0238387 A1 Aug. 23, 2018

Related U.S. Application Data (60) Provisional application No. 62/121,443, filed on Feb. 26, 2015.

(51) Int. Cl.
*H02K 7/09* (2006.01)
*F16C 32/04* (2006.01)

(52) U.S. Cl.
CPC ........ *F16C 32/0465* (2013.01); *F16C 32/044* (2013.01); *F16C 32/0459* (2013.01);
(Continued)

(58) Field of Classification Search
CPC ................ F16C 32/0465; F16C 32/048; F16C 32/0482; F16C 32/0485; F16C 32/0487;
(Continued)

(56) References Cited

U.S. PATENT DOCUMENTS 4,037,886 A   7/1977  Boden et al.
4,196,946 A   4/1980  Lipscomb
(Continued)

FOREIGN PATENT DOCUMENTS

CN   201307809 Y   9/2009
CN   201696492 U   1/2011
(Continued)

OTHER PUBLICATIONS

Chinese Office Action dated Jan. 25, 2019 for Chinese Patent Application No. 201680012346.0.
(Continued)

*Primary Examiner* — Quyen P Leung
*Assistant Examiner* — Alexander A Singh
(74) *Attorney, Agent, or Firm* — Bachman & LaPointe, P.C.

(57) ABSTRACT

A magnetic bearing (20) comprises: a rotor (22) to be supported for rotation about an axis (502); a stator (24) extending from a first end (30) to a second end (32) and comprising: one or more first permanent magnets (110); one or more second permanent magnets (112) of polarity substantially opposite to a polarity of the one or more first permanent magnets; at least three radial windings (40,42, 44,46); a first axial winding (34); a second axial winding (36); a first end pole (120); and a second end pole (122).

22 Claims, 8 Drawing Sheets (52) U.S. Cl.
CPC ...... *F16C 32/0461* (2013.01); *F16C 32/0468* (2013.01); *F16C 32/0485* (2013.01); *H02K 7/09* (2013.01)

(58) Field of Classification Search
CPC .............. F16C 32/0459; F16C 32/0461; F16C 32/0463; F16C 32/0468; F16C 32/047; F16C 32/0472; F16C 32/0474; F16C 32/0476; F16C 32/0478; F16C 32/0489; F16C 32/0491; F16C 32/0493; F16C 32/0495; F16C 32/0497; F16C 32/044; H02K 7/09; H02K 1/08
USPC .................................................. 310/90.5, 90
See application file for complete search history.

(56) References Cited

U.S. PATENT DOCUMENTS

| | | | |
|---|---|---|---|
| 4,285,552 A | | 8/1981 | Sutter |
| 4,447,793 A | * | 5/1984 | Gray ........................ G08B 5/24 310/156.08 |
| 4,542,311 A | | 9/1985 | Newman et al. |
| 4,732,353 A | | 3/1988 | Studer |
| 4,891,567 A | * | 1/1990 | Fujitani ................ H02K 21/227 310/68 R |
| 5,095,237 A | | 3/1992 | Bardas et al. |
| 5,179,308 A | * | 1/1993 | Malsky ............... F16C 32/0459 310/90.5 |
| 5,216,308 A | | 6/1993 | Meeks |
| 5,231,336 A | | 7/1993 | van Namen |
| 5,315,197 A | * | 5/1994 | Meeks ................ F16C 32/0476 310/90.5 |
| 6,121,704 A | | 9/2000 | Fukuyama et al. |
| 6,130,494 A | | 10/2000 | Schöb |
| 6,278,251 B1 | | 8/2001 | Schöb |
| 6,351,048 B1 | * | 2/2002 | Schob ................ F16C 32/0459 310/90.5 |
| 6,359,357 B1 | * | 3/2002 | Blumenstock ...... F16C 32/0465 310/90.5 |
| 6,727,617 B2 | | 4/2004 | McMullen et al. |
| 6,777,841 B2 | | 8/2004 | Steinmeyer |
| 6,849,960 B2 | * | 2/2005 | Hartman ................... H02J 7/32 290/10 |
| 7,786,638 B2 | | 8/2010 | Pulnikov et al. |
| 7,859,144 B1 | | 12/2010 | Sahyoun |
| 7,868,510 B2 | | 1/2011 | Rittenhouse |
| 8,169,118 B2 | | 5/2012 | Filatov |
| 8,400,038 B2 | | 3/2013 | Smith et al. |
| 8,847,451 B2 | | 9/2014 | Filatov et al. |
| 2004/0022653 A1 | | 2/2004 | Brunet et al. |
| 2009/0079284 A1 | * | 3/2009 | Onuma ............... F16C 32/0465 310/90.5 |
| 2010/0231076 A1 | | 9/2010 | Chiba et al. |
| 2011/0163622 A1 | | 7/2011 | Filatov et al. |
| 2012/0299422 A1 | | 11/2012 | Filatov |
| 2012/0306305 A1 | * | 12/2012 | Filatov ................ F16C 32/0463 310/90.5 |
| 2015/0330444 A1 | * | 11/2015 | Wang ................. F16C 32/0459 310/90.5 |

FOREIGN PATENT DOCUMENTS

| | | |
|---|---|---|
| CN | 201730962 U | 2/2011 |
| CN | 102042327 A | 5/2011 |
| CN | 102305242 B | 3/2013 |
| CN | 103427538 A | 12/2013 |
| CN | 103671522 A | 3/2014 |
| CN | 103758766 A | 4/2014 |
| CN | 203962688 U | 11/2014 |
| EP | 0071456 A1 | 2/1983 |
| EP | 2945173 A2 | 11/2015 |
| JP | 58184319 A | 10/1983 |
| JP | 11101233 A | 4/1999 |
| JP | 2002161918 A | 6/2002 |
| JP | 2010121713 A | 6/2010 |
| JP | 2013231471 A | 11/2013 |
| WO | 97/00639 A2 | 1/1997 |
| WO | 2014/007851 A1 | 1/2014 |

OTHER PUBLICATIONS

International Search Report and Written Opinion dated May 31, 2016 for PCT/US2016/017943.

European Office Action dated Jan. 23, 2000 for European Patent Application No. 16709187.5.

Chinese Office Action dated Mar. 31, 2020 for Chinese Patent Application No. 201680012346.0.

* cited by examiner

MAGNETIC BEARING

CROSS-REFERENCE TO RELATED APPLICATION

Benefit is claimed of U.S. Patent Application No. 62/121,443, filed Feb. 26, 2015, and entitled "Magnetic Bearing", the disclosure of which is incorporated by reference herein in its entirety as if set forth at length.

BACKGROUND

The disclosure relates to magnetic bearings. More particularly, the disclosure relates to electromagnetic bearings utilized in turbomachines.

A well-developed art exists in active magnetic bearings. US Patent Application Publication 2011/0163622A1, published Jul. 7, 2011, discloses an electromagnetic bearing providing radial and axial support. For axial support, the stator has a pair of opposite axial poles are joined at an outer diameter (OD) by an axial back iron. An axial coil circumferentially wraps inboard of the back iron and creates a flux path through the axial poles and back iron with an inboard gap between the axial poles spanned by an actuator target formed by a rotor lamination stack within the gap.

Radially inboard of the axial coil, the stator comprises a radial actuator pole assembly formed by a lamination stack. This lamination stack has a full annulus outer ring portion and a plurality of radially-inward projections each of which is wrapped by an associated radial control coil. Adjacent the radial actuator pole assembly at opposite axial ends thereof, sandwiched between the radial actuator pole assembly and the axial poles, are a pair of permanent magnetic rings.

A pair of radial flux loops are created at opposite sides proceeding radially from the actuator target through the radial pole assembly, turning axially outboard through the permanent magnet and then radially inboard through the associated axial pole, turning back axially inward to enter the end of the actuator target and then turning back radially outward. Thus, a pair of radial fluxes of opposite sign are encircled by the axial flux loop.

Another four-radial-pole radial bearing configuration involves flux paths that pass radially and circumferentially rather than axially. In this configuration, switching can be between several conditions. One group involves flux paths with a central diametric leg through one opposed pair of poles and two circumferential legs passing circumferentially through the back iron around the respective poles of the other pair. The two pairs thus create two possible such paths with two possible directions for each path. Additionally another group involves a first flux path leg passing radially through one pole, turning circumferentially to pass through the back iron to one of the two adjacent poles and then returning back radially through that adjacent pole to meet the first leg in the shaft.

SUMMARY

One aspect of the disclosure involves a magnetic bearing comprising: a rotor to be supported for rotation about an axis; a stator extending from a first end to a second end and comprising: one or more first permanent magnets; one or more second permanent magnets of polarity substantially opposite to a polarity of the one or more first permanent magnets; at least three radial windings; a first axial winding; a second axial winding; a first end pole; and a second end pole.

In one or more embodiments of the other embodiments, the at least three radial windings are wound on at least one center core.

In one or more embodiments of the other embodiments, the at least one center core comprises a center laminate. A center back iron is radially outboard of the center laminate. A first end laminate is axially outboard of the center laminate. A first end back iron is radially outboard of the first end laminate. A second end laminate is axially outboard of the center laminate oppositely to the first end laminate. A second end back iron is radially outboard of the second end laminate.

In one or more embodiments of the other embodiments, the at least three radial windings comprise three radial windings angularly offset at 120° intervals.

In one or more embodiments of the other embodiments, the at least three radial windings comprise: a first pair of diametrically opposite radial windings; and a second pair of diametrically opposite radial windings.

In one or more embodiments of the other embodiments, the second pair of radial windings is orthogonal to the first pair.

In one or more embodiments of the other embodiments, the first pair of radial windings and the second pair of radial windings each comprise a first radially-open winding and a second radially-open winding.

In one or more embodiments of the other embodiments, each winding of the first pair of radial windings and the second pair of radial windings and the first axial winding and the second axial winding is electrically connected to a respective H-bridge amplifier.

In one or more embodiments of the other embodiments, one or more laminate stacks extend through the coils of the first pair of radial windings and the second pair of radial windings.

In one or more embodiments of the other embodiments, one or more first end laminate stacks and one or more first end back irons are between the first permanent magnet and first end pole. One or more second end laminate stacks and one or more second end back irons are between the second permanent magnet and second end pole In one or more embodiments of the other embodiments, the first axial winding and the second winding are connected in series to pass current in opposite angular directions.

In one or more embodiments of the other embodiments, the rotor comprises a metallic core carrying an axially laminated metallic jacket.

In one or more embodiments of the other embodiments, the first end pole and second end pole extend radially inboard of the axially laminated metallic jacket.

In one or more embodiments of the other embodiments, the one or more first permanent magnets is a first permanent magnet ring and the one or more second permanent magnets is a second permanent magnet ring.

In one or more embodiments of the other embodiments, the first permanent magnet ring is a first continuous full annulus ring and the second permanent magnet ring is a second continuous full annulus ring.

In one or more embodiments of the other embodiments, the first permanent magnet ring comprises at least three circumferential segments and the second permanent magnet ring comprises at least three circumferential segments.

In one or more embodiments of the other embodiments, the stator further comprises: a central back iron between the one or more first permanent magnets and the one or more second permanent magnets; a first end back iron axially outboard of the one or more first permanent magnets; and a second end back iron axially outboard of the one or more second permanent magnets.

In one or more embodiments of the other embodiments, in central longitudinal half-section centrally through one of the at least three radial windings: a first radial flux loop without limit as to direction: passes radially outward through a central laminate of the stator passing within said one of the at least three radial windings; turns axially outboard in a central back iron; passes axially outboard through the one or more first permanent magnets; turns radially inward within a first end back iron; passes radially inward through a first end laminate stack; jumps a radial gap to pass radially through a rotor laminate stack; turns axially inward axially inboard of the rotor laminate stack; turns radially outward to pass back through the rotor laminate stack; and jumps the radial gap to complete the first radial flux loop. A first axial flux loop without limit as to direction: passes radially through the first end laminate stack; turns axially outboard through the first end back iron; passes axially outward, turns and passes radially inward, and then turns and passes axially inward within the first end pole; jumps the axial gap between the first end pole and the rotor axially inboard of the rotor laminate stack; turns radially outward to pass back radially outward through the rotor laminate stack; and jumps the radial gap to complete the first axial loop. A first PM bias axial flux loop without limit as to direction: passes radially outward through the central laminate of the stator passing within the first of the diametrically opposite windings; turns axially outboard in the central back iron; passes axially outboard through the one or more first permanent magnets; passes axially outboard through the first end back iron; turns radially inward and then axially inward within the first end pole; jumps an axial gap between the first end pole and the rotor axially inboard of the rotor laminate stack; turns radially outward to pass back through the rotor laminate stack; and jumps the radial gap to complete the first PM bias axial flux loop.

In one or more embodiments of the other embodiments, in said central longitudinal half-section: a second radial flux loop is disposed with axial symmetry across the transverse centerplane, of path but not necessarily direction, to the first radial flux loop; a second axial flux loop is disposed with axial symmetry across the transverse centerplane, of path but not necessarily direction, to the first axial flux loop; and a second PM bias axial flux loop is disposed with axial symmetry across the transverse centerplane, of path but not necessarily direction, to the first PM bias axial flux loop.

In one or more embodiments of the other embodiments, a method for using the magnetic bearing comprises running current through: the at least three radial windings; the first axial winding; the second axial winding, so as to: control axial force or position by simultaneously powering the first axial winding and the second axial winding; and control radial force or position by powering the at least three radial windings.

In one or more embodiments of the other embodiments, the at least three radial windings are powered by at least two H-bridge amplifiers and the first and second axial windings are powered by at least one H-bridge amplifier.

In one or more embodiments of the other embodiments, the at least three radial windings are each powered by a respective associated H-bridge amplifier and the first and second axial windings are each powered by a respective associated H-bridge amplifier.

In one or more embodiments of the other embodiments, a machine comprises the bearing.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
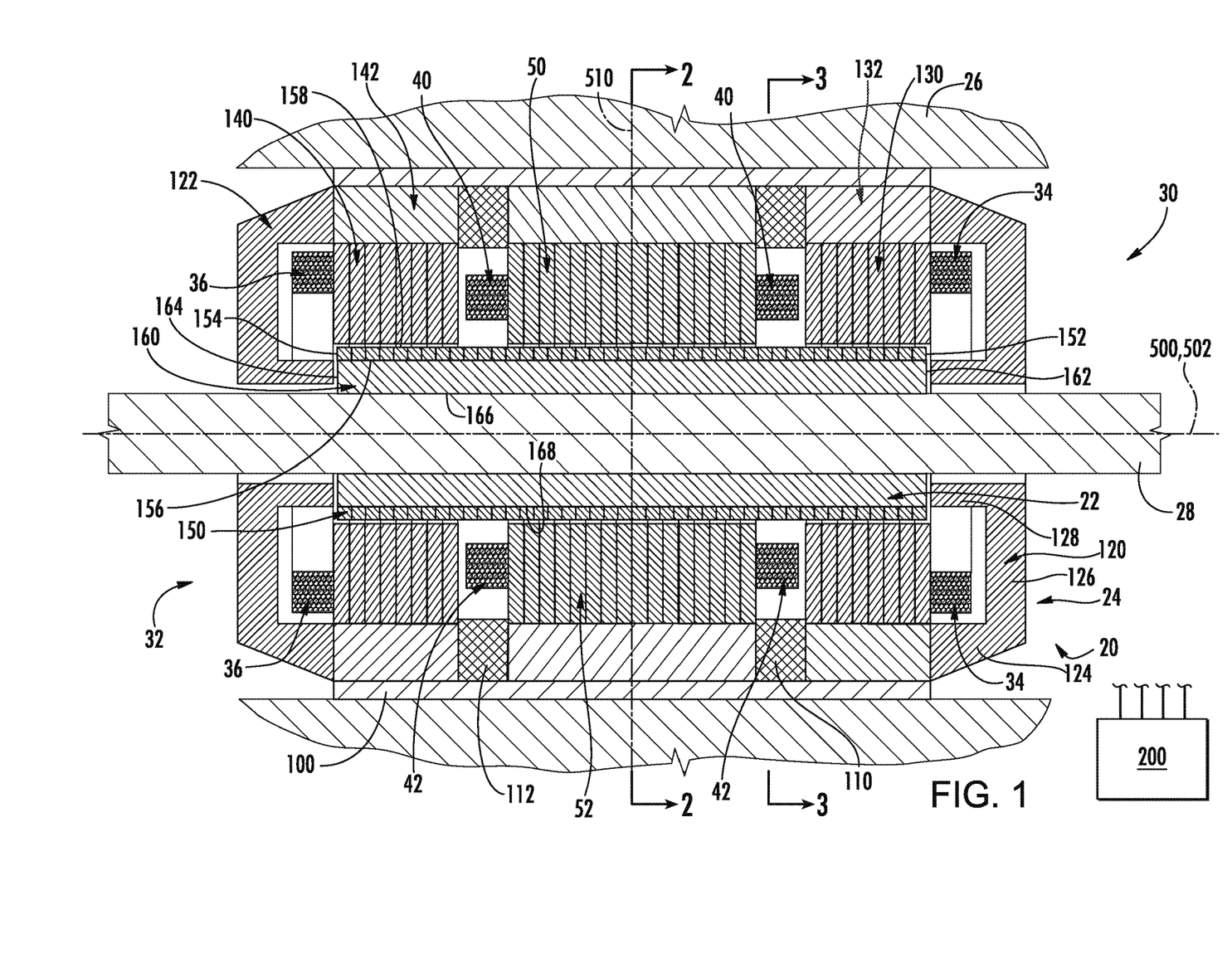
FIG. 1 is a partial, partially schematic central longitudinal axial sectional view of an electromagnetic bearing in a compressor.

FIG. 1 shows an integrated radial/axial homopolar bearing 20 having a rotor 22 and a stator 24. The stator has a central longitudinal axis 500. The rotor has a central longitudinal axis 502. The axes 500 and 502 are nominally normally coincident; however, the bearing may absorb slight excursions of the rotor axis relative to the stator axis. The magnetic bearing may be used in a turbomachine (e.g., a compressor) wherein the stator is mounted to a housing or case of the compressor and the rotor is mounted to a shaft of the compressor. A transverse centerplane is shown as 510. For purposes of schematic illustration, the housing or case is shown as 26 and the shaft shown as 28.

The bearing extends from a first end 30 to a second end 32. The stator includes a number of coils (e.g., metallic wire windings). For axial supporting the rotor, near the first end, the stator includes a first axial coil 34 circumscribing the axes 500, 502. Near the second end 32, the stator includes a second axial coil 36 also circumscribing the axes 500, 502. The exemplary axial coils which are around axes 500, 502 may be electrically connected in series or controlled separately so that currents through them create an axial control field that either opposes or assists the permanent magnet bias field. The direction of this permanent magnet bias field depends upon the magnetization of the permanent magnet 110, 112.

The axial coils 36, 34 on either end of the bearing may be wound circumferentially about the axes 500, 502 in opposite directions. In such a case, the coils can be either series connected or individually controlled with the currents being in the same circumferential direction with respect to the axes 500, 502. If the axial coils 36, 34 are wound in the same circumferential direction, then the direction of the currents flowing through the axial coils must be opposite to each other. The axial coils can be either series connected or individually controlled with appropriate connections.

For radially supporting the rotor, the stator comprises a plurality of radial coils. The exemplary radial coils are arranged in a plurality of coils spatially distributed around the rotor circumference at 90° intervals. The exemplary embodiment comprises two diametrically opposite pairs orthogonal to each other. An exemplary six-coil embodiment would have three pairs of coils angularly spaced 60° apart and so forth.

Figure 2:
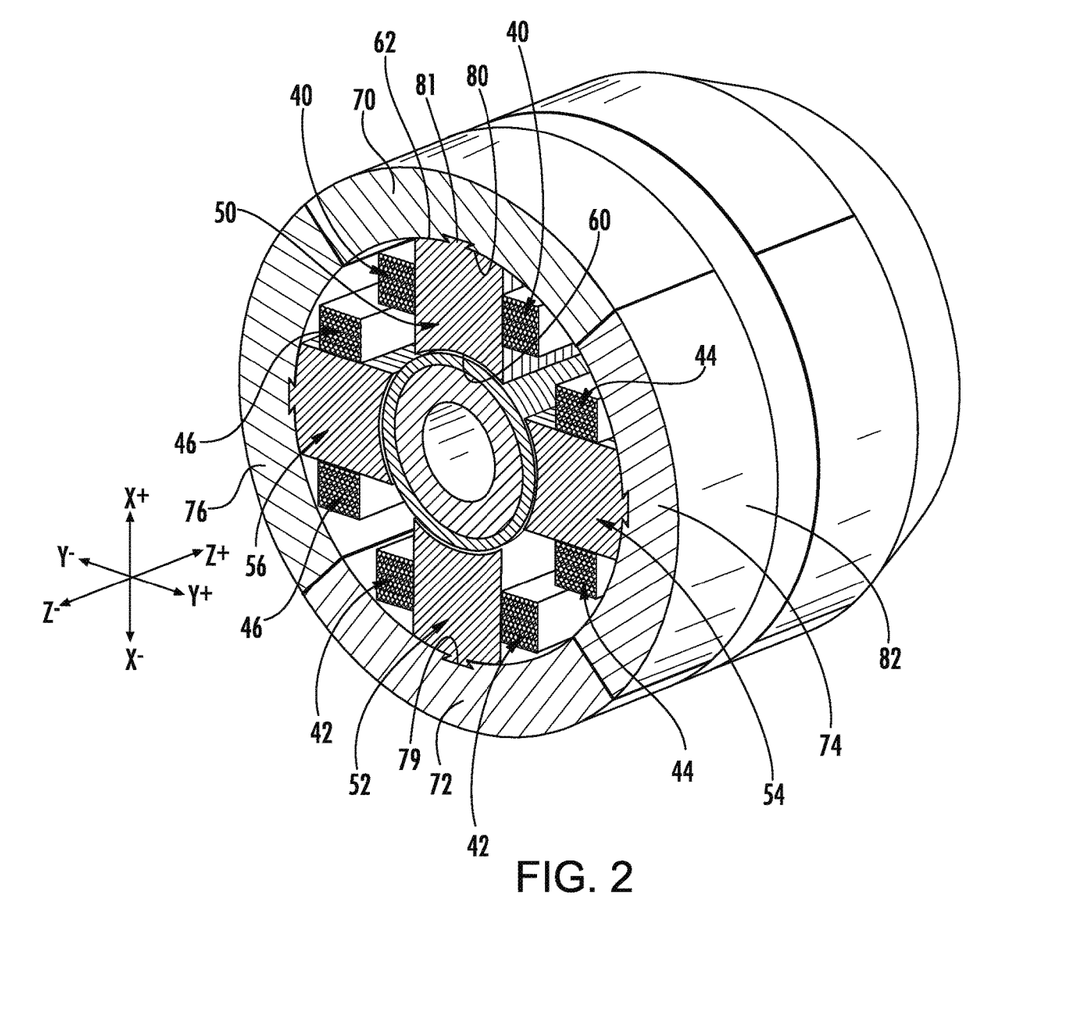
FIG. 2 is a transverse cutaway view of the bearing of FIG. 1 cutaway at line 2-2 of FIG. 1.
Figure 3:
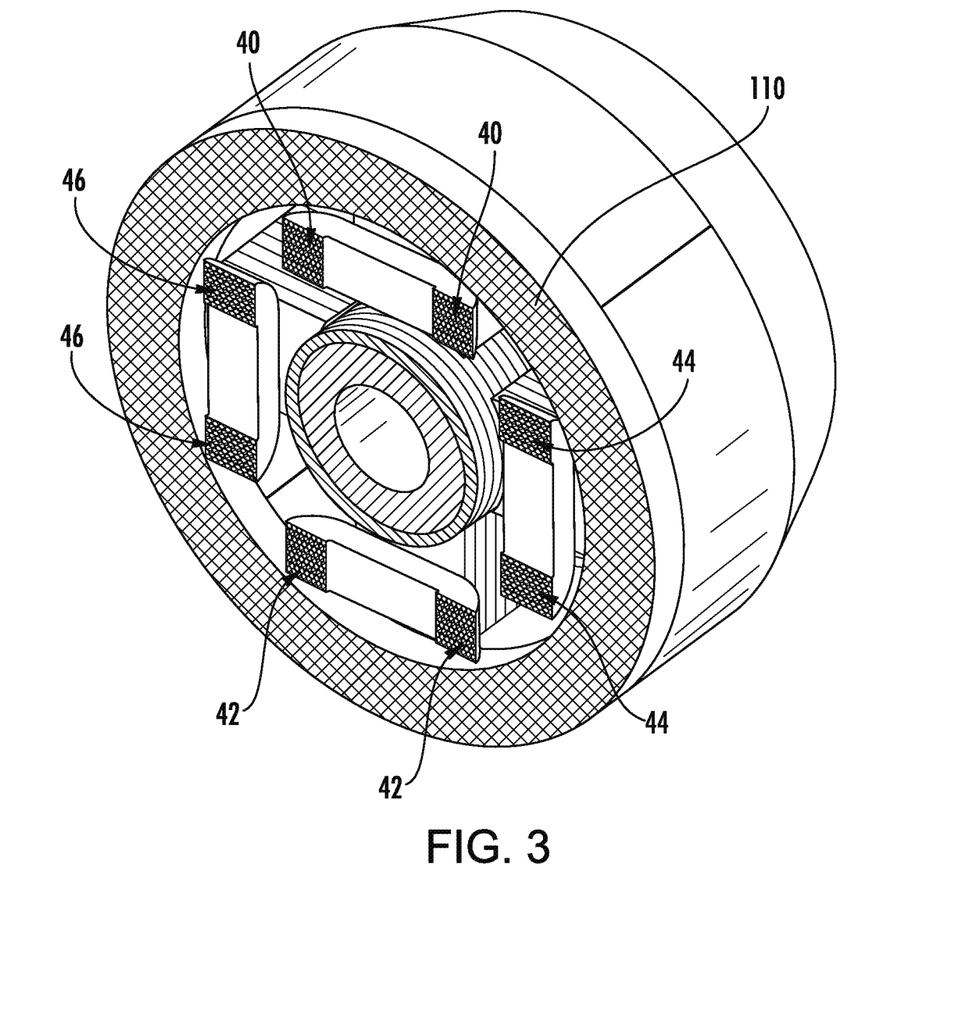
FIG. 3 is a transverse cutaway view of the bearing of FIG. 1 taken along line 3-3 of FIG. 1.
Figure 4:
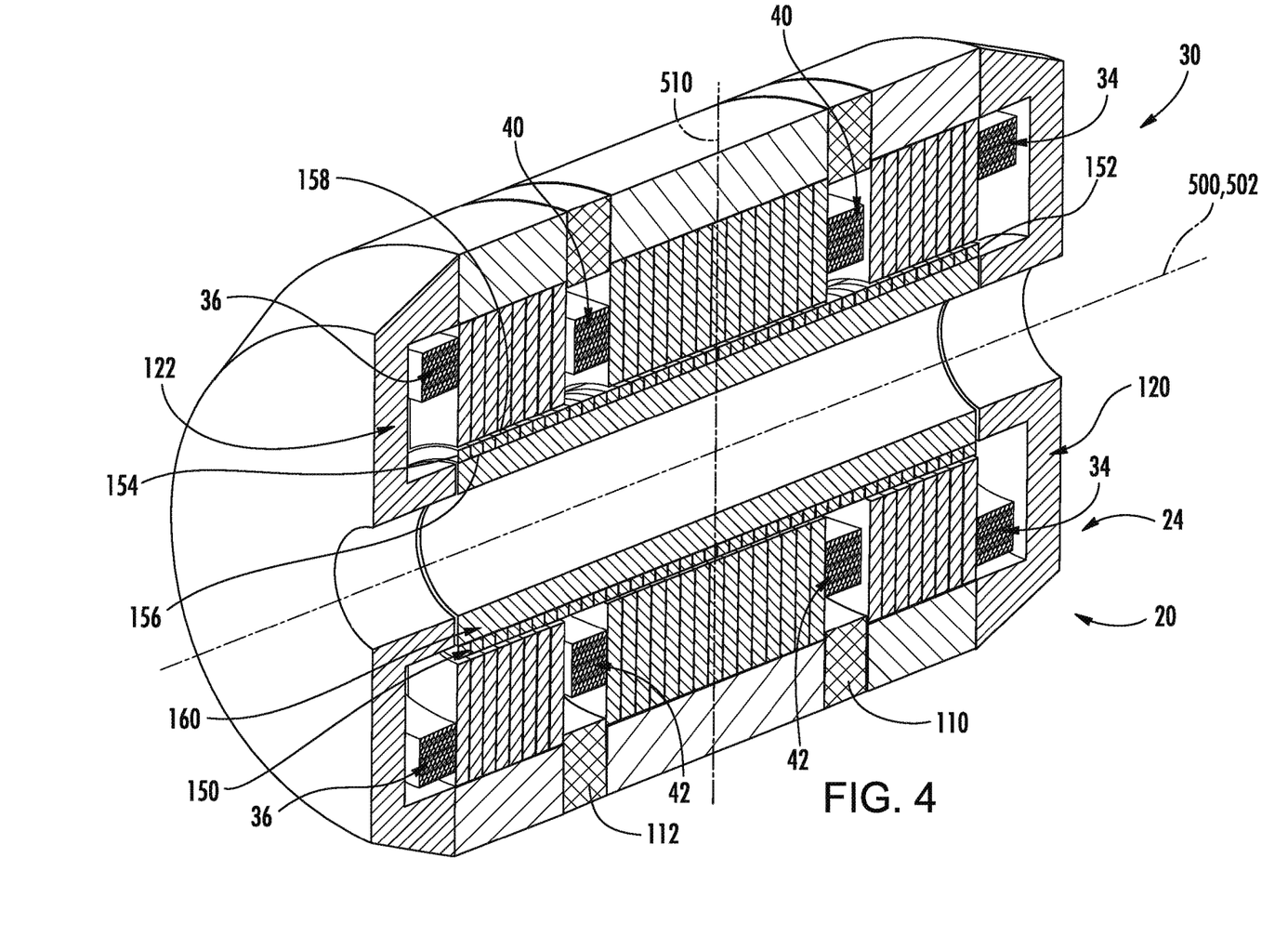
FIG. 4 is an oblique cutaway view of the bearing of FIG. 1.

The first pair of radial coils comprises radial coils (windings) 40 and 42 and the second pair comprises radial coils 44 and 46 (FIG. 2). The windings of the radial coils extend circumferentially and axially to circumscribe a radially-extending lamination (laminate) 50, 52, 54, 56 discussed below. Exemplary laminates are axial stacks of steel plates (e.g., soft magnetic steel or silicon steel). Use of laminate reduces eddy loss relative to a single block of steel. The laminate within the coils functions as a core.

The radial coils 40, 42 may be wound in the same or opposite direction depending on the direction of the control current to either assist or oppose the permanent magnet (PM) bias flux. Similar considerations apply to coils 46 and 44.

Radial coils can be controlled individually or diametrically opposite coils can be connected in series for control of the radial bearing. If the number of radial coils is odd (with minimum of three poles), then the coils must be individually controlled, whereas, if the number of radial coils is even, they can either be controlled individually or the diametrically opposite coils can be connected in series for control.

Each of the laminations 50, 52, 54, 56 extends from a radially inboard or inner diameter (ID) end 60 in close facing proximity to the rotor to an outboard or outer diameter (OD) end 62. The exemplary OD ends 62 are mounted to a central back iron circumscribing the axis. Exemplary back iron materials are steels (e.g., silicon steel or soft magnetic steel), amorphous powder, or ferrite. Alternatives might have air-core configurations with air or magnetically inert material (e.g., plastic) in place of the back iron.

The exemplary central back iron, however, is segmented into respective segments 70, 72, 74, 76 associated with each of the laminations 50, 52, 54, 56. A first exemplary mounting may be adhesive. An alternative exemplary mounting (FIG. 2) may be by interfitting features such as an axial dovetail groove 79 in the inner diameter (ID) face 80 of the back iron or back iron segment and a complementary dovetail projection 81 along the OD end 62 of the lamination. The exemplary segments 70, 72, 74, 76 each have an outer diameter (OD) face 82 which combine to form an outer diameter (OD) surface of the central back iron as a whole. For such a segmented central back iron, the back iron segments may be maintained together by an outer sleeve 100 (FIG. 1, e.g., mounted within a bore of the compressor or other turbomachine). Yet other variations on the laminations may include the four laminations 50, 52, 54, 56 being near radially inward projections from an outer sleeve portion of a lamination. Thus, each plate of the lamination may be formed having a portion corresponding to the sleeve and a portion corresponding to each of the inward radial projections.

In addition to the laminations 50, 52, 54, 56, the stator comprises a first permanent magnet ring 110 (FIG. 1) and a second permanent magnet ring 112 coaxially axially spaced apart from each other. The permanent magnet rings have opposite axial polarity. In this example, the north poles of both magnets face the inward to the transverse centerplane 510 and the axially-opposite south poles face axially outboard/outward.

Each ring 110, 112 has an inner diameter (ID) face, an outer diameter (OD) face, and opposite axial end faces. The rings 110 and 112 are mounted at opposite sides (axial ends) of the central back iron.

Axially outboard of the magnetic rings 110, 112 are outboard laminates and associated back irons. These may be formed in similar fashion to the central lamination stack and back iron and function to complete flux paths discussed below. For purposes of illustration, the first end laminate(s) is/are shown as 130 and first end back iron(s) shown as 132 while the second end laminate(s) is/are shown as 140 and second end back iron(s) shown as 142 (e.g., rather than assigning separate numerals to the four segments of each of these). Outboard of the two respective outboard laminate and back iron combinations are respective end caps or end poles 120, 122. In this example, each end pole is a single circumferential piece rather than segmented. In other implementations, these may, for example, be integrated with the outboard back irons. These each have a generally C-shaped half cross-section with a radially outboard sleeve portion 124, a radially extending end web 126, and a radially inboard sleeve portion 128. This defines an annular channel accommodating/receiving the associated axial winding 34, 36. Although the exemplary back irons 132, 142 are shown as separate pieces from the adjacent poles/endcaps 120, 122, each of the back irons 132, 142 could be unitarily formed with the associated pole/endcap as a single piece. In such a situation, the portion of the piece radially outboard of the laminate or core 130, 140 would be identified as the back iron.

The rotor comprises a rotor laminate stack 150. The rotor laminate stack extends from a first end 152 to a second end 154 and has an inner diameter (ID) face 156 and an outer diameter (OD) face 158.

The rotor laminate stack 150 may be mounted directly to a shaft of the compressor or may be mounted on a sleeve 160 (e.g., having opposite first and second axial ends 162, 164, an interior bore defined by ID surface 156 receiving the shaft 28, and an OD surface 168 mounting the laminate stack 150).

By combining radial and axial bearings in a single package, one or more of several advantages may be achieved. This may include a compact and lightweight package. Relative to the aforementioned bearing of US2011/0163622A1, efficiencies may be increased. One aspect of such an increase may involve reducing any turning of flux paths in laminates. For example, the ID gap between axial poles may be spanned by non-laminate rotor material 160. Relative to alternative configurations having twin axial fluxes, this can reduce the amount of turning of the flux path that occurs in the laminate as the turning will be in the metal of the shaft or sleeve inboard of the laminate. Similarly, the relatively thin rotor laminate allows the inboard turning of the radial fluxes to occur inboard of the rotor laminate. These radial lamination will also help reduce the eddy current losses induced on the rotor side. The outboard turning of the radial fluxes may also occur outboard of the radial laminates.

Figure 5:
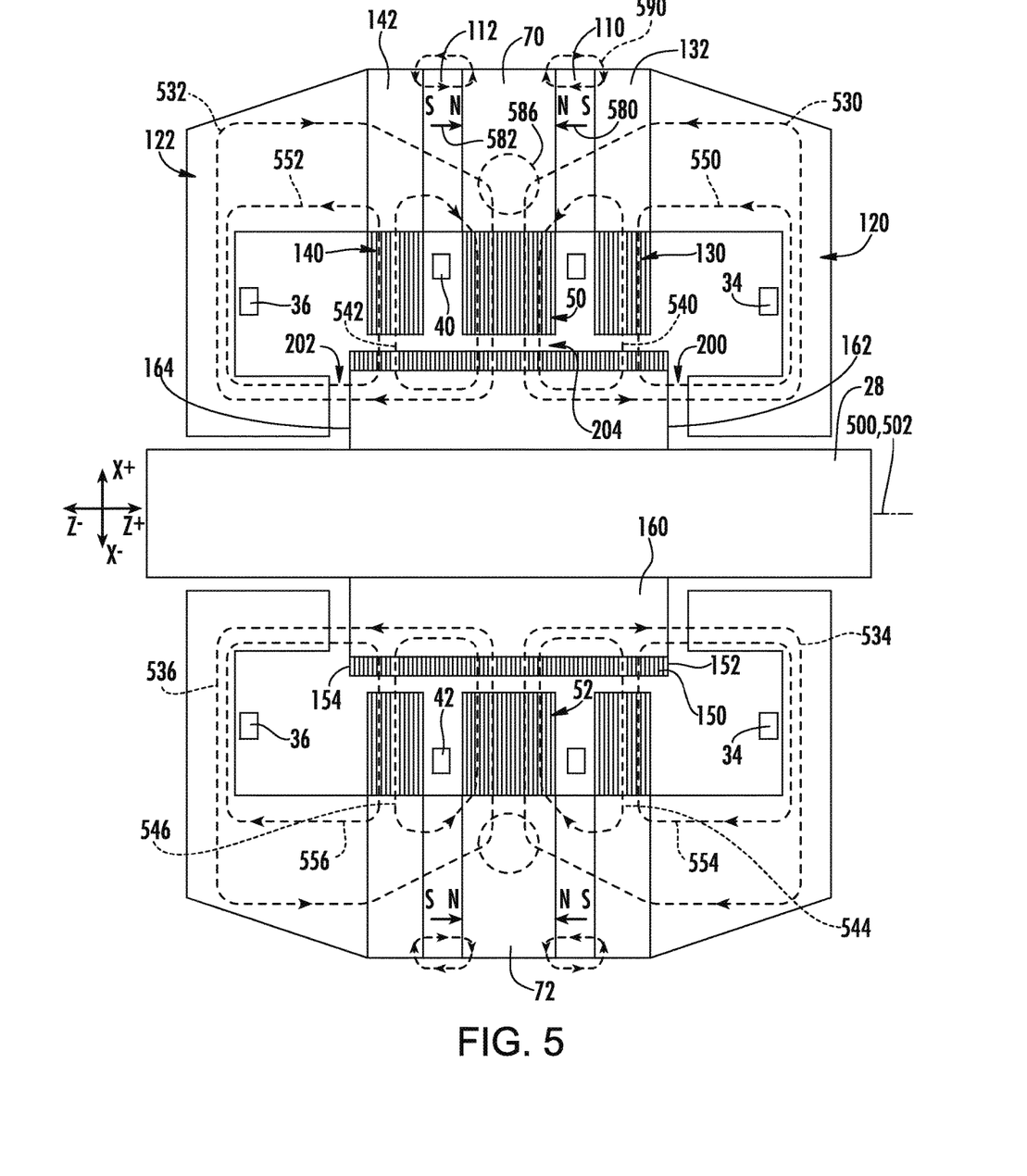
FIG. 5 is a schematic central longitudinal sectional median magnetic flux diagram centrally through a first pair of diametrically opposite radial windings.

FIG. 5 shows in central longitudinal section centrally through the first pair of diametrically opposite radial windings approximate medians of the permanent magnet magnetic flux loops. These include: (a) PM bias axial flux loops 530, 532, 534, 536 (associated with axial support); (b) radial flux loops 540, 542, 544, 546 (associated with radial support) associated with the first pair of radial windings and reflecting a combination of PM bias and coil/current-induced fluxes; and (c) axial flux loops 550, 552, 554, 556 induced by the associated axial winding. In axial section centrally through the other pair(s) of radial windings, similar flux loops associated with such other pair(s) would be shown.

The exemplary loops are: a first PM bias axial flux loop 530; a second PM bias axial flux loop 532 axially opposite the loop 530; a third PM bias axial flux loop 534 radially opposite the loop 530; a fourth PM bias axial flux loop 536 radially opposite the loop 532 and axially opposite the loop 534; a first radial flux loop 540; a second radial flux loop 542 axially opposite the loop 540; a third radial flux loop 544 radially opposite the loop 540; a fourth radial flux loop 546 radially opposite the loop 542 and axially opposite the loop 544; a first axial flux loop 550, axially outboard of the loop 540; a second axial flux loop 552 axially opposite the loop 550 and axially outboard of the loop 542; a third axial flux loop 554 radially opposite the loop 550; and a fourth axial flux loop 556 radially opposite the loop 552.

In said sectional view, the first PM bias axial flux loop 530: passes radially outward through the central laminate 50 of the stator passing within the first 40 of the diametrically opposite windings 40, 42; turns axially outboard in the central back iron 70; passes axially outboard through the first permanent magnet ring 110; passes axially outboard through the first end back iron 132; turns radially inward and then axially inward within the first end pole 120; jumps the axial gap 200 between the first end pole and the end 162 of rotor material 160 axially inboard of the rotor laminate stack 150 (an opposite end gap associated with loops 532 and 536 shown as 202); turns radially outward to pass back radially outward through the rotor laminate stack 150; and jumps the radial gap 204 (between rotor laminate 150 and stator central laminate 50) to complete the first PM bias axial flux loop. For purposes of illustration, the directions discussed only illustrate the shape of the distribution, the actual flux may have an opposite sign/sense as discussed below.

In said sectional view, the first radial flux loop 540: passes radially outward through the central laminate 50 of the stator passing within the first 40 of the diametrically opposite windings; turns axially outboard in the central back iron 70; passes axially outboard through the first permanent magnet ring 110; turns radially inward within the first end back iron 132; passes radially inward through the first end laminate stack 130; jumps the radial gap (between first end laminate and rotor laminate) to pass radially through the rotor laminate stack 150 into the rotor non-laminate material 160; turns axially inward axially inboard of the rotor laminate stack; turns radially outward to pass radially back through the rotor laminate stack 150; and jumps the radial gap 204 to complete the first radial flux loop.

In sectional view, the first axial flux loop 550: passes radially through radial lamination 130; turns axially outboard through back iron 132; turns radially inward and then axially inward within the first end pole 120; jumps the axial gap 200 between the first end pole and the end 162 of rotor material 160 axially inboard of the rotor laminate stack 150 turns radially outward to pass back radially outward through the rotor laminate stack 130; and jumps the radial gap 204 (between rotor laminate 150 and stator central laminate 50) to complete the first axial flux loop.

In sectional view, the first axial flux loop 550: passes radially through radial lamination 130; turns axially outboard through back iron 132; turns radially inward and then axially inward within the first end pole 120; jumps the axial gap 200 between the first end pole and the end 162 of rotor material 160 axially inboard of the rotor laminate stack 150 turns radially outward to pass back radially outward through the rotor laminate stack 150; and jumps the radial gap 204 (between rotor laminate 150 and first end laminate 130) to complete the first axial flux loop.

The other loops similarly pass through the components in their quadrant of the FIG. 5 cross-section.

Powering of the various winding may be used to alter magnetic flux in the loops to apply desired corrective axial and radial forces to the rotor.

Figure 9:
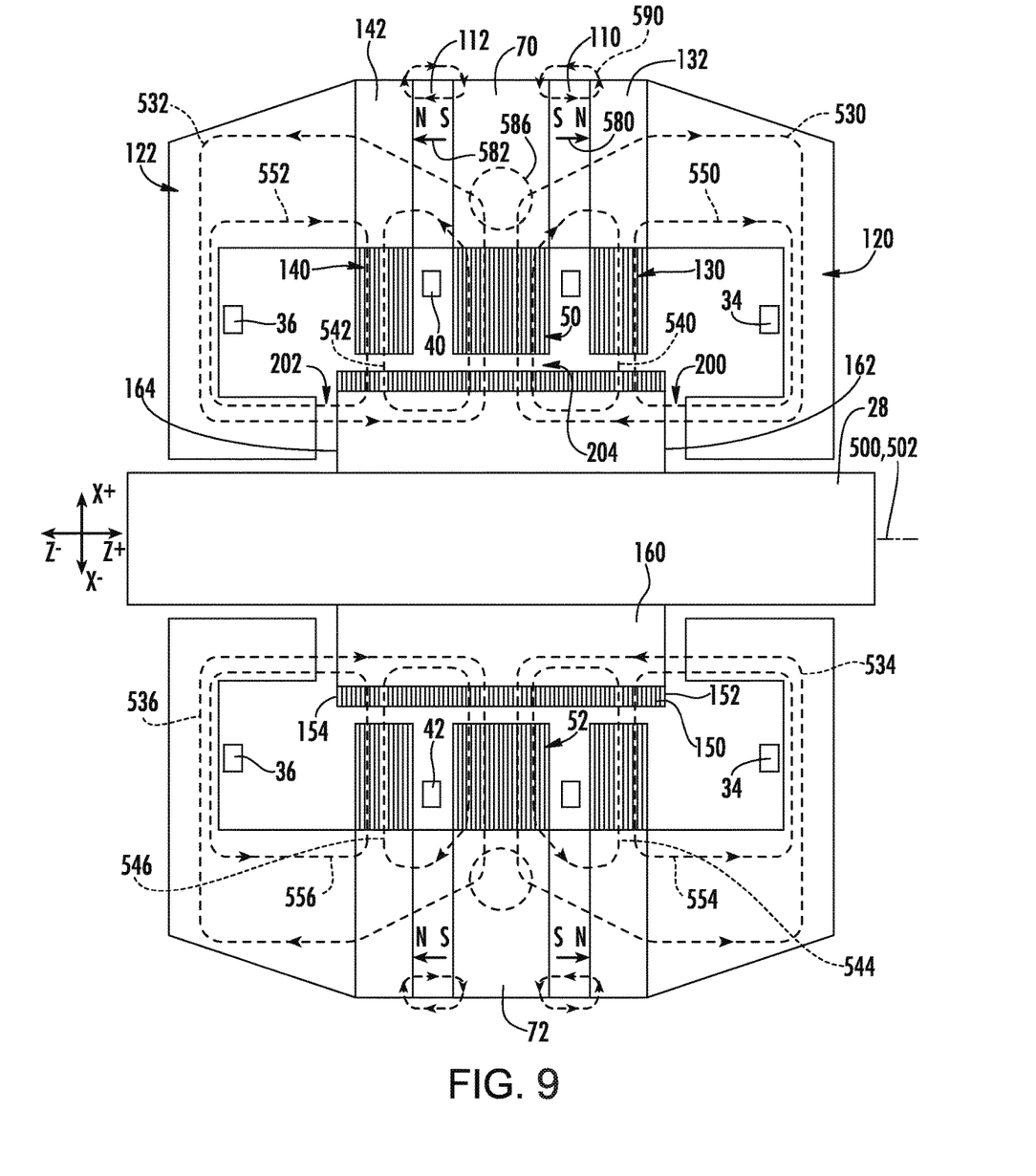
FIG. 9 is a schematic central longitudinal sectional median magnetic flux diagram centrally through a first pair of diametrically opposite radial windings with opposite direction to FIG. 5.

FIG. 5 shows the various flux loops with arrowheads indicating one exemplary flux direction. Operation is discussed below relative to those illustrated directions with possible design variations or operating conditions reversing the directions relative to those shown (e.g., FIG. 9 shows reversed permanent magnetic polarity and flux direction). In the FIG. 5 example with axially inward polarity 580, 582 of the permanent magnets, the PM bias axial flux loops 530 and 536 are counterclockwise, while 532 and 534 are opposite (clockwise) as dictated by the permanent magnet polarity.

Loops 540, 542, 544, and 546 are shown with the same flux interaction as the associated PM axial loop surrounding them. Because these loops reflect a combination of PM and current-induced flux, the respective coil 40 or 42 may be operated in such a way so as to augment the natural PM flux direction shown or partially counter it or fully counter it (i.e., reversing the flux direction from that illustrated).

FIG. 5 also shows leakage flux loops 590. These are partially associated with asymmetries in the magnet polarities. Precise opposite axial polarity will tend to minimize the flux loops. In general, manufacturing tolerances will limit the precision. Substantial opposite orientations may be measured as local or average values. In general, the values would be within about 45° of exactly opposite, preferably within about 30° or about 20° or about 10°. Potentially higher asymmetries up to 90° might also be envisioned. Similarly, manufacturing tolerances, may affect the magnetic strength of the two magnets. Both should be within about 10% of each other. The illustrated configuration has general axial symmetry (across the transverse centerplane) in magnet size and strength and coil turns and other geometric factors. However designing for asymmetric loading may cause asymmetry in size and strength of magnets or asymmetry in coil turns or the like.

The flux directions for the current-induced axial flux loops 550, 552, 554, and 556 lack symmetry. The loops 550 and 552 are shown in the same direction as each other (counterclockwise) and the loops 554 and 556 are shown in the same direction as each other but opposite the loops 550 and 552.

Examples of control are discussed relative to the exemplary sheet orientation of FIG. 5 and X, Y, and Z axes of FIGS. 2 and 5.

Exemplary radial displacement will be arbitrarily initially discussed with an example along to the X-axis which extends centrally radially through the coils/windings 40 and 42. With no axial load, there will be no current flowing in the coils 34 and 36. In this condition, the flux loops 550, 552, 554, and 556 will effectively vanish. The exemplary FIG. 5 arrowhead directions for flux in these loops are associated with energizing the coils 34, 36 to apply force to the rotor in the Z+ direction.

If there was a no radial load situation (e.g., in zero gravity or if the shaft were oriented vertically or if the coils were spaced horizontally) then there would be no baseline energizing of the coils 40 and 42 and there would, correspondingly, be no electromagnetic component of flux along the paths 540, 542, 544, 546. Thus, because the coils 44 and 46 are spaced horizontally, and there is no baseline horizontal radial load, the coils 44 and 46 would not be baseline energized and would not create associated electromagnetic flux components along the associated paths.

In the illustrated example, the current applied to the coils 540 and 542 will create an electromagnetic component of the flux either in the direction shown or opposite thereto. If in the direction shown, this will merely increase the magnitude of the flux. If in the opposite direction, this may decrease the magnitude of the combined flux but, in most anticipated situations, will not lead to a net reversal of flux direction from that shown.

A baseline gravitational or other load will be compensated for by energizing the appropriate coils to provide a counter-force. In an example discussed below, the rotor axis is horizontal and a baseline load is a gravitational load in the X− direction.

With reference to FIG. 5, if the rotor 28 is displaced in the X+ direction due to an external load or disturbance from its global centerline 500, then the controller will counter this by applying current in radial coil 40 to reduce the flux amplitude in the radial loops 540 and 542 resulting in reduced local flux density in the air-gap 204. This will minimize the local attraction force exerted by the stationary bearing components 50, 70. Simultaneously, the controller will increase the current in radial coil 42 to increase the flux amplitude in the radial loops 544 and 546 resulting in increased local flux density in the air-gap 204. This will increase the local attraction force exerted by the stationary bearing components 52, 72. If the rotor is displaced in the X− direction, similar control in the opposite direction will be applied. The direction of the currents in the coil 40 and 42 is determined based on the coil winding direction.

Displacement along the Y-axis is similarly controlled to motion along the X-axis but using bearing components 54, 74, 56, 76, 44, 46. The direction of the currents in the coil 44 and 46 is determined based on the coil winding direction.

With reference to FIG. 5, if the rotor 28 is displaced in the Z+ direction due to an external load or disturbance from the transverse centerplane 510, then the controller will apply current in axial coil 34 to reduce the flux amplitude (total of loops 530 and 550) in the air-gap 200 by controlling flux magnitude in the loop 550. Thus, if there already is current producing flux in the direction illustrated for the loop 550, this current may be decreased or even reversed. This will minimize the attraction force exerted by the stationary axial bearing components 120. Simultaneously, the controller will control the current in coil 36 to increase the flux amplitude in the air-gap 202 by controlling flux magnitude in the loop 552. In the illustrated example, because the directions for loops 550 and 552 are shown hypothesizing a baseline force in the Z+ direction, the increase of the flux magnitude would first be achieved merely by reducing the magnitude of the current in coil 36 and, thereby, reducing the amount that the loop flux of 552 counters the loop flux of 532. If sufficient force is required, the current in the coil 36 may be reversed, reversing the direction of induced flux in the loop 552. This will increase the attraction force exerted by the stationary axial bearing components 122.

If the rotor is displaced in the Z− direction, similar control in the opposite direction will be applied. For example, if starting from a zero axial force baseline, currents would be initiated in the coils 34 and 36 to create fluxes in the loops 550 and 552 in the directions shown. If there was a baseline force being applied in the Z+ direction, the magnitudes of these currents would be increased from their baseline values. The direction of the currents in the coils 34 and 36 is determined based on the coil winding direction.

Additionally, the flux focusing effect occurs in the stator central back iron 70, 72, 74, 76 due to permanent magnets 110 and 112. Because the magnets are magnetized axially opposite to each other, the resulting flux lines would create a flux concentration/focusing effect that happens in the central back iron at approximate location 586. This will also contribute to certain leakage flux through the frame 26. The flux concentration effect results in increased bias flux that passes through the radial lamination 50 and radial air gap 204 to assist the radial and axial bearing functionality. The advantages of this approach are: (a) since the majority of the flux in the air-gap is contributed by the permanent magnet's bias flux, the required control flux to maintain the rotor center line 502 aligned with axis 500 is small (this enables a smaller coil size and current requirements catering to the control functionality); (b) due to flux concentration in the region 586, it is possible to use lower energy density permanent magnets; (c) if higher energy density permanent magnets are used, increased flux concentration in the region 586 enables lower permanent magnet volume.

FIG. 1 further shows a controller 200. The controller may be integrated with or provided by a controller of the turbomachine (e.g. electric compressor) as a whole or the system (e.g., refrigeration system). The controller may receive user inputs from an input device (e.g., switches, keyboard, or the like) and sensors (not shown, e.g., pressure sensors and temperature sensors at various system locations and, specifically for bearing control, radial position sensors (e.g., relative to the FIGS. 2 and 5 directions, a single X sensor and a single Y sensor mounted in the bearing) and axial position sensors (e.g., a single Z sensor mounted in the bearing)). The controller may be coupled to the sensors and controllable system components (e.g., valves, the bearings, the compressor motor, vane actuators, and the like) via control lines (e.g., hardwired or wireless communication paths). The controller may include one or more: processors; memory (e.g., for storing program information for execution by the processor to perform the operational methods and for storing data used or generated by the program(s)); and hardware interface devices (e.g., ports) for interfacing with input/output devices and controllable system components.

Figure 6:
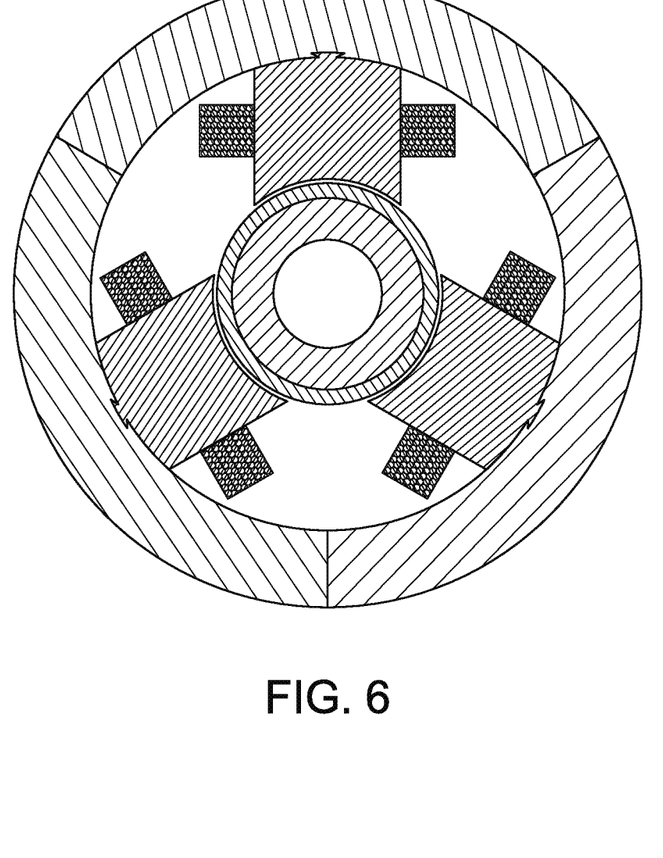
FIG. 6 is a transverse cutaway view of an alternate electromagnetic bearing.

FIG. 6 shows an alternative bearing configuration that has three radial coils and associated radial poles. In this example, the currents through the three radial coils would be independently controllable to provide full two-dimensional radial control. The radial coils and poles are evenly spaced about the centerline at 120° intervals. The three-coil/pole configuration is a practical minimum. The four-coil embodiment discussed above may provide computationally simpler control. Yet greater numbers of coils/poles are also possible.

Flux arrangements for the FIG. 6 embodiment will be similar to the flux of the four pole embodiment when both are viewed in a central longitudinal half section (i.e., outward from the centerline in only one radial direction rather than the two radial directions shown in in the full central longitudinal section of FIG. 5 as respectively above and below the centerline).

Other variations involve circumferentially segmenting the permanent magnets. The segmenting may, in some embodiments, create a segmented full annulus (with essentially no circumferential gaps between segments). However, other noteworthy embodiments involve segments separated by gaps. For example, the segments could essentially be circumferentially coextensive with the teeth of the laminations 50, 52, 54, 56 extending through the associated radial coils

40, 42, 44, 46. The back irons may be similarly segmented. For example, this may be used to create a modular system wherein an individual subunit comprises: a single radial coil; the laminations that would extend therethrough; the associated two permanent magnets; and the back iron segment axially joining the two magnets. The number of these subunits (three or more) used to create a bearing would depend upon the radial load rating of the bearing. For example, one could envision a system wherein three, four, five, or six of these subunits were used depending upon the load rating.

With such a pair of segmented permanent magnets (alternatively characterized as two circumferential arrays of permanent magnets) a number of further variations are possible. In a basic variation, all magnets within each of the two circumferential arrays have the same polarity as the other magnets in such array with the polarity of the two arrays being opposite to each other. In yet other variations, the polarities of the individual two magnets of the subunit are opposite each other but the magnets in each array need not be the same polarity. Thus, for example, in the four subassembly example, two of the subassemblies may have one polarity orientation and the other two may have the opposite polarity orientation. Depending upon circumstances, the polarity might be shared by the two subunits opposite each other.

Figure 7:
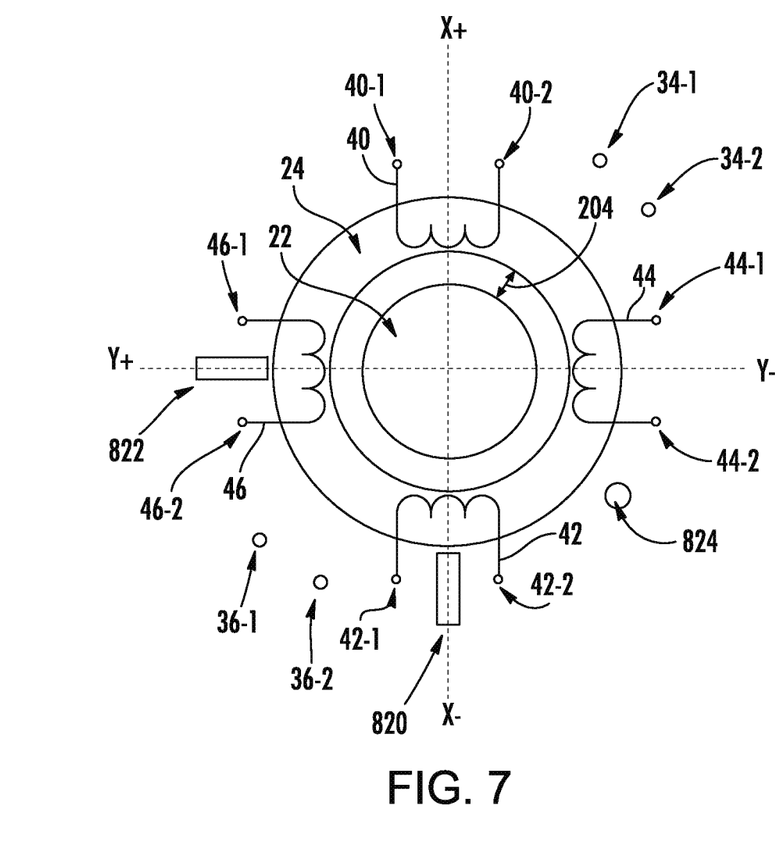
FIG. 7 is a partially schematic end view of coils and sensors in a four-radial coil embodiment.

FIG. 7 schematically shows the radial coils 40, 42, 44, 46. The coils each have a respective pair of terminals 40-1, 40-2; 42-1, 42-2; 44-1, 44-2; 46-1, 46-2. FIG. 7 further schematically shows the X position sensor 820, the Y position sensor 822, and the Z position sensor 824. Similarly, schematically shown are terminals 34-1 and 34-2 of the axial coil 34 and 36-1 and 36-2 of the axial coil 36.

In the exemplary four-radial coil embodiment, X axis position/force is controlled by controlling current in the coils 40 and 42 responsive to position feedback input from the sensor 820. Y axis position/force is controlled by controlling current in the coils 44 and 46 responsive to position feedback input from the sensor 822. Z axis position/force is controlled by controlling current in the coils 34 and 36 responsive to position feedback from the sensor 824. In an exemplary embodiment, the controller 200 performs individual control over each of the coils. As noted above, alternatively, some or all of the coils may be paired and powered either in series or parallel.

Figure 8:
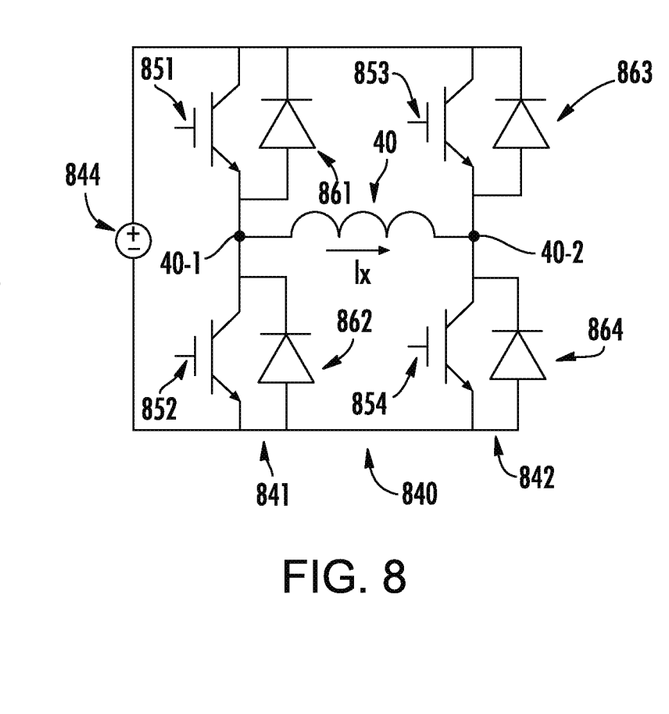
FIG. 8 is a schematic view of an H-bridge amplifier used to power one or more coils.

FIG. 8 shows an H-bridge amplifier 840 used to power one or more coils. This may be controlled by or integrated with the controller 200. In one example, each H-bridge amplifier 840 has a single associated coil and vice-versa. For purposes of illustration, the amplifier is shown connected to the coil 40. Similar amplifiers would be coupled to the other coils in similar fashion. The amplifier 840 has two legs or branches 841 and 842 connected in parallel to a voltage source 844. The exemplary voltage source 844 is a constant DC voltage source and may be shared by the H-bridge amplifiers of the different coils.

The terminals 40-1 and 40-2 of the coil are connected across central locations of the two legs 841 and 842. To each side (high voltage and low voltage) of each leg, the terminal 40-1, 40-2 is connected to the voltage source via the parallel combination of a respective switching device 851, 852, 853, 854 and diode 861, 862, 863, 864. Exemplary switching devices are gate controlled switching devices such as insulated gate bipolar transistors (IGBT) or metal oxide field effect transistors (MOSFET).

By parallel connecting the diodes with the switches, the diodes provide a path for a free-wheeling current (a decaying current dissipating energy stored in the inductor) when the associated switch is off/open. This is associated with a decaying force.

In a first exemplary operational condition, the switches 851 and 854 are closed and the switches 852 and 853 are open (a first state of the switches). Current flows from the positive terminal of the voltage source 844 through the first leg/branch high switch 851 to the terminal 40-1 and through the coil 40 to the terminal 40-2. From the terminal 40-2, the current passes through the second leg/branch low switch 854 to return to the voltage source negative terminal.

If switch 854 remains closed while switch 851 is opened (a second state of the switches), the stored energy in the coil will cause a freewheeling current to flow through the coil in the same direction. However, this current passes from the coil through the switch 854 and then back through the first leg/branch low diode 862. The rate of decay is determined by the coil time constant. If the energy stored in the inductor is small, the current amplitude will reduce to zero before this stage completes.

If the switch 854 is then opened (a third state of the switches), and if the stored energy has not yet been completely dissipated, the current will continue to flow in the same direction but now from the coil 40 through the second leg/branch high diode 863 back to the positive terminal of the voltage source and then back through the first leg/branch low diode 862 to return to the coil. The current will continue to decay and its magnitude can reach zero.

Upon switching back to the first operating switch state, the current will start rising again. This current amplitude in the coil will be positive and increase as a function of the coil time constant, supply voltage and the duration of the switching event. It will also store energy in the associated inductor during this state of operation. This increase may be from zero or from a nonzero value. Consequently, the rising and falling amplitude of the current as the system cycles through the switch states will result in an average value which provides the desired reference value required to generate the force in the bearing.

Exemplary operation involves sequential cyclical switching between these three conditions. For reference respective times in each of the three states are designated $t_1$, $t_2$, and $t_3$. The sum of these three is the total switching period and may be fixed. The turn on and turn off duration of the switches is determined by its duty cycle which is proportional to the average voltage required to synthesize the average current in the coil.

During steady state cycling (fixed $t_1$, $t_2$, and $t_3$), the average voltage across the coil is given by:

$$V_L = V_{DC} * t_1 / (t_1 + t_2)$$

where $V_{DC}$ is the DC source voltage. The average DC current is given by:

$$I_X = V_L / R$$

where R is the coil resistance.

In order to keep the current transients at a very low value and synthesize a DC current proportional to the desired force, the above operation is repeated at very high rate (several thousand Hz).

Assume a 10 kHz frequency. The period is thus 100 microseconds=$t_1+t_2+t_3$. Control may thus be achieved by controlling $t_1$, $t_2$, and $t_3$. Principally, it may be controlled by controlling $t_1$. In one example, a control of switching between the second and third switch states then determines $t_2$, and $t_3$. For example, the switching between the second and third switch states may occur when a given current or voltage decay has occurred. One example is at a current threshold equal to the target average current that the controller is trying to achieve or maintain. With this process, $t_2$, will typically be much larger than $t_3$. When measured average current over a given cycle is below the target, the controller may increase $t_1$ for the next cycle (or next controlled cycle if there is a lag). The increase may be by a set increment or by an increment calculated based upon the difference between actual and target values.

For operation involving passing current in the opposite direction (i.e., through the coil 40 from terminal 40-2 to terminal 40-1) operation is similar but involves switching of the switches 852 and 853 instead of the switches 851 and 854. Roles of the various diodes thus similarly transition with the first leg/branch high diode 861 and second leg/branch low diode 864 coming into play.

Contrasted with different alternative prior art bearings, various implementations may have one or more of several advantages. As noted above, some prior art radial bearings have flux paths passing deep into the shaft and/or passing circumferentially to pass through two angularly offset poles. Avoiding the circumferential path reduces core losses.

The use of "first", "second", and the like in the description and following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing basic system, details of such configuration or its associated use may influence details of particular implementations. Accordingly, other embodiments are within the scope of the following claims.

What is claimed is:

1. A magnetic bearing (20) comprising:
   a rotor (22) to be supported for rotation about an axis (502);
   a stator (24) extending from a first end (30) to a second end (32) and comprising:
     one or more first permanent magnets (110);
     one or more second permanent magnets (112) of polarity substantially opposite to a polarity of the one or more first permanent magnets;
     at least three radial windings (40,42,44,46);
     a first axial winding (34);
     a second axial winding (36);
     a first end pole (120); and
     a second end pole (122),
   wherein:
     the rotor comprises a metallic core (160, 28) carrying an axially laminated metallic jacket (150); and
     the first end pole and second end pole extend radially inboard of an inner diameter surface of the axially laminated metallic jacket.

2. The magnetic bearing of claim 1 wherein:
   the at least three radial windings (40,42,44,46) are wound on at least one center core (50, 52, 54, 56).

3. The magnetic bearing of claim 2 wherein:
   the at least one center core comprises a center laminate (50, 52, 54, 56);
   a center back iron (70, 72, 74, 76) is radially outboard of the center laminate;
   a first end laminate (130) is axially outboard of the center laminate;
   a first end back iron (132) is radially outboard of the first end laminate;
   a second end laminate (140) is axially outboard of the center laminate oppositely to the first end laminate; and
   a second end back iron (142) is radially outboard of the second end laminate.

4. The magnetic bearing of claim 1 wherein the at least three radial windings comprise:
   three radial windings angularly offset at 120° intervals.

5. The magnetic bearing of claim 1 wherein the at least three radial windings comprise:
   a first pair of diametrically opposite radial windings (40, 42); and
   a second pair of diametrically opposite radial windings (44, 46).

6. The magnetic bearing of claim 5 wherein:
   the second pair of radial windings is orthogonal to the first pair.

7. The magnetic bearing of claim 5 wherein the first pair of radial windings and the second pair of radial windings each comprise:
   a first radially-open winding (40, 44); and
   a second radially-open winding (42, 46).

8. The magnetic bearing of claim 7 wherein:
   each winding of the first pair of radial windings and the second pair of radial windings and the first axial winding and the second axial winding is electrically connected to a respective H-bridge amplifier.

9. The magnetic bearing of claim 5 further comprising:
   one or more laminate stacks (50, 52, 54, 56) extending through the coils of the first pair of radial windings and the second pair of radial windings.

10. The magnetic bearing of claim 1 wherein:
    the first axial winding and the second axial winding are connected in series to pass current in opposite angular directions.

11. The magnetic bearing of claim 1 wherein:
    the one or more first permanent magnets is a first permanent magnet ring; and
    the one or more second permanent magnets is a second permanent magnet ring.

12. The magnetic bearing of claim 11 wherein:
    the first permanent magnet ring is a first continuous full annulus ring; and
    the second permanent magnet ring is a second continuous full annulus ring.

13. The magnetic bearing of claim 11 wherein:
    the first permanent magnet ring comprises at least three circumferential segments; and
    the second permanent magnet ring comprises at least three circumferential segments.

14. The magnetic bearing of claim 1 wherein the stator further comprises:
    a central back iron (70, 72, 74, 76) between the one or more first permanent magnets and the one or more second permanent magnets;
    a first end back iron (132) axially outboard of the one or more first permanent magnets; and
    a second end back iron (142) axially outboard of the one or more second permanent magnets.

15. A method for using the magnetic bearing of claim 1, the method comprising running current through:
the at least three radial windings;
the first axial winding;
the second axial winding,
so as to:
control axial force or position by simultaneously powering the first axial winding and the second axial winding; and
control radial force or position by powering the at least three radial windings.

16. The method of claim 15 wherein:
the at least three radial windings are powered by at least two H-bridge amplifiers; and
the first and second axial windings are powered by at least one H bridge amplifier.

17. The method of claim 15 wherein:
the at least three radial windings are each powered by a respective associated H-bridge amplifier; and
the first and second axial windings are each powered by a respective associated H-bridge amplifier.

18. A magnetic bearing (20) comprising:
a rotor (22) to be supported for rotation about an axis (502);
a stator (24) extending from a first end (30) to a second end (32) and comprising:
one or more first permanent magnets (110);
one or more second permanent magnets (112) of polarity substantially opposite to a polarity of the one or more first permanent magnets;
at least three radial windings (40,42,44,46);
a first axial winding (34);
a second axial winding (36);
a first end pole (120); and
a second end pole (122),
wherein in central longitudinal half-section centrally through one of the at least three radial windings:
a first radial flux loop (540, 542, 544, 546) or reverse thereof:
passes radially outward through a central laminate of the stator passing within said one of the at least three radial windings;
turns axially outboard in a central back iron;
passes axially outboard through the one or more first permanent magnets;
turns radially inward within a first end back iron;
passes radially inward through a first end laminate stack;
jumps a radial gap to pass radially through a rotor laminate stack;
turns axially inward axially inboard of the rotor laminate stack;
turns radially outward to pass back through the rotor laminate stack; and
jumps the radial gap to complete the first radial flux loop;
a first axial flux loop (550, 552, 554, 556) or reverse thereof:
passes radially through the first end laminate stack;
turns axially outboard through the first end back iron;
passes axially outward, turns and passes radially inward, and then turns and passes axially inward within the first end pole;
jumps the axial gap between the first end pole and the rotor axially inboard of the rotor laminate stack;
turns radially outward to pass back radially outward through the rotor laminate stack; and
jumps the radial gap to complete the first axial loop; and
a first PM bias axial flux loop (530, 532, 534, 536) or reverse thereof:
passes radially outward through the central laminate of the stator passing within the first of the diametrically opposite windings;
turns axially outboard in the central back iron;
passes axially outboard through the one or more first permanent magnets;
passes axially outboard through the first end back iron;
turns radially inward and then axially inward within the first end pole;
jumps an axial gap between the first end pole and the rotor axially inboard of the rotor laminate stack;
turns radially outward to pass back through the rotor laminate stack; and
jumps the radial gap to complete the first PM bias axial flux loop.

19. The magnetic bearing of claim 18 wherein in said central longitudinal half-section:
a second radial flux loop is disposed with axial symmetry across a transverse centerplane, of path but not necessarily direction, to the first radial flux loop;
a second axial flux loop is disposed with axial symmetry across the transverse centerplane, of path but not necessarily direction, to the first axial flux loop; and
a second PM bias axial flux loop is disposed with axial symmetry across the transverse centerplane, of path but not necessarily direction, to the first PM bias axial flux loop.

20. A magnetic bearing (20) comprising:
a rotor (22) to be supported for rotation about an axis (502) and having a rotor laminate stack (150);
a stator (24) extending from a first end (30) to a second end (32) and comprising:
one or more first permanent magnets (110);
one or more second permanent magnets (112) of polarity substantially opposite to a polarity of the one or more first permanent magnets;
at least three radial windings (40,42,44,46);
a first axial winding (34);
a second axial winding (36);
a first end pole (120);
a second end pole (122);
a first axial gap (200) between the first end pole and a first end (162) of rotor material (160) radially inboard of an inner diameter surface of the rotor laminate stack (150); and
a second axial gap (202) axially opposite the first axial gap between the second end pole and a second end (164) of the rotor material.

21. A magnetic bearing (20) comprising:
a rotor (22) to be supported for rotation about an axis (502) and having a rotor laminate stack (150);
a stator (24) extending from a first end (30) to a second end (32) and comprising:
one or more first permanent magnets (110);
one or more second permanent magnets (112) of polarity substantially opposite to a polarity of the one or more first permanent magnets;
at least three radial windings (40,42,44,46);
a first axial winding (34);
a second axial winding (36);
a first end pole (120);
a second end pole (122);

one or more first end laminate stacks (130) and one or more first end back irons (132) between the first permanent magnet and first end pole;
one or more second end laminate stacks (140) and one or more second end back irons (142) between the second permanent magnet and second end pole;
a center laminate (50, 52, 54, 56); and
a radial gap between the rotor laminate stack (150) and the center laminate, one or more first end laminate stacks, and one or more second end laminate stacks.

22. The magnetic bearing of claim 21 wherein:
the first end back iron (132) is radially outboard of the first end laminate; and
the second end back iron (142) is radially outboard of the second end laminate.

\* \* \* \* \*